(12) United States Patent
Mallya et al.

(10) Patent No.: US 7,472,189 B2
(45) Date of Patent: Dec. 30, 2008

(54) METHOD OF COLLECTING DATA FROM NETWORK ELEMENTS

(75) Inventors: Arvind R. Mallya, Walnut Creek, CA (US); Paul Tomalenas, Alamo, CA (US); Brad Fry, Stockton, CA (US); Ken Dresser, Pleasant Grove, CA (US); Bruce Schine, San Leandro, CA (US); Todd Ramsey, Baytown, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 542 days.

(21) Appl. No.: 11/186,342

(22) Filed: Jul. 21, 2005

(65) Prior Publication Data

US 2007/0036308 A1 Feb. 15, 2007

(51) Int. Cl.
*G06F 15/173* (2006.01)
*H04N 7/10* (2006.01)
*G06F 15/16* (2006.01)
*G06F 7/04* (2006.01)

(52) U.S. Cl. .................... 709/224; 709/223; 726/4; 725/33

(58) Field of Classification Search ............... None
See application file for complete search history.

(56) References Cited

U.S. PATENT DOCUMENTS

| | | | |
|---|---|---|---|
| 6,061,335 A | 5/2000 | De Vito et al. | |
| 6,145,001 A | 11/2000 | Scholl et al. | |
| 6,434,619 B1 | 8/2002 | Lim et al. | |
| 6,543,051 B1 | 4/2003 | Manson et al. | |
| 6,661,772 B2 | 12/2003 | Matsuno et al. | |
| 6,662,221 B1 | 12/2003 | Gonda et al. | |
| 6,718,384 B2 | 4/2004 | Linzy | |
| 6,721,726 B1 | 4/2004 | Swaminathan et al. | |
| 6,751,663 B1* | 6/2004 | Farrell et al. ............... | 709/224 |
| 7,133,916 B2* | 11/2006 | Schunemann ............. | 709/224 |
| 2002/0169866 A1* | 11/2002 | Lim et al. ................. | 709/223 |
| 2002/0174207 A1* | 11/2002 | Battou ....................... | 709/223 |
| 2003/0005112 A1* | 1/2003 | Krautkremer ............. | 709/224 |
| 2003/0138251 A1 | 7/2003 | Jayaram et al. | |
| 2003/0225876 A1 | 12/2003 | Oliver et al. | |
| 2004/0098474 A1 | 5/2004 | Galou et al. | |
| 2004/0107277 A1* | 6/2004 | Levesque et al. ............ | 709/223 |
| 2004/0120270 A1 | 6/2004 | Saxon et al. | |
| 2005/0047787 A1 | 3/2005 | Norman | |

* cited by examiner

*Primary Examiner*—Wen-Tai Lin
(74) *Attorney, Agent, or Firm*—Brooks Kushman P.C.

(57) ABSTRACT

Method of collecting data from one or more network elements used to support customer networks. The method may include compiling a customer list from information extracted from a customer information database and an operation processes database. The customer list may be used to indicate one or more customers, the network elements associated therewith, and network addresses for each of the listed network elements. The method may include automatically generating data collection messages to the network addresses specified in the customer list.

13 Claims, 2 Drawing Sheets

US 7,472,189 B2

METHOD OF COLLECTING DATA FROM NETWORK ELEMENTS

BACKGROUND OF THE INVENTION

1. Field of the Invention

The present invention relates to method of collecting data from network elements.

2. Background Art

Networks are supported by any number of network elements. A service provider may provision and otherwise support the network elements for use by network subscribers. One aspect of providing quality customer service requires the service provider to collect data from the network elements for use in monitoring the operation thereof. The data may be used by the service provider to track performance issues and to otherwise manage the operation thereof.

One aspect of particular importance to customers is network performance, such as whether the network performance meets or exceeds contractual commitments made by the service provider. Commonly, the service providers offer different levels of service with the services having greater performance being associated with greater subscription fees. Because performance metrics and other parameters associated with the operation of the network elements are concealed from the customers, the customers are unable to verify whether the service provider is meeting their contractual commitments. Likewise, this lack of visibility also limits the ability of the customers to trouble-shoot their own networks.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
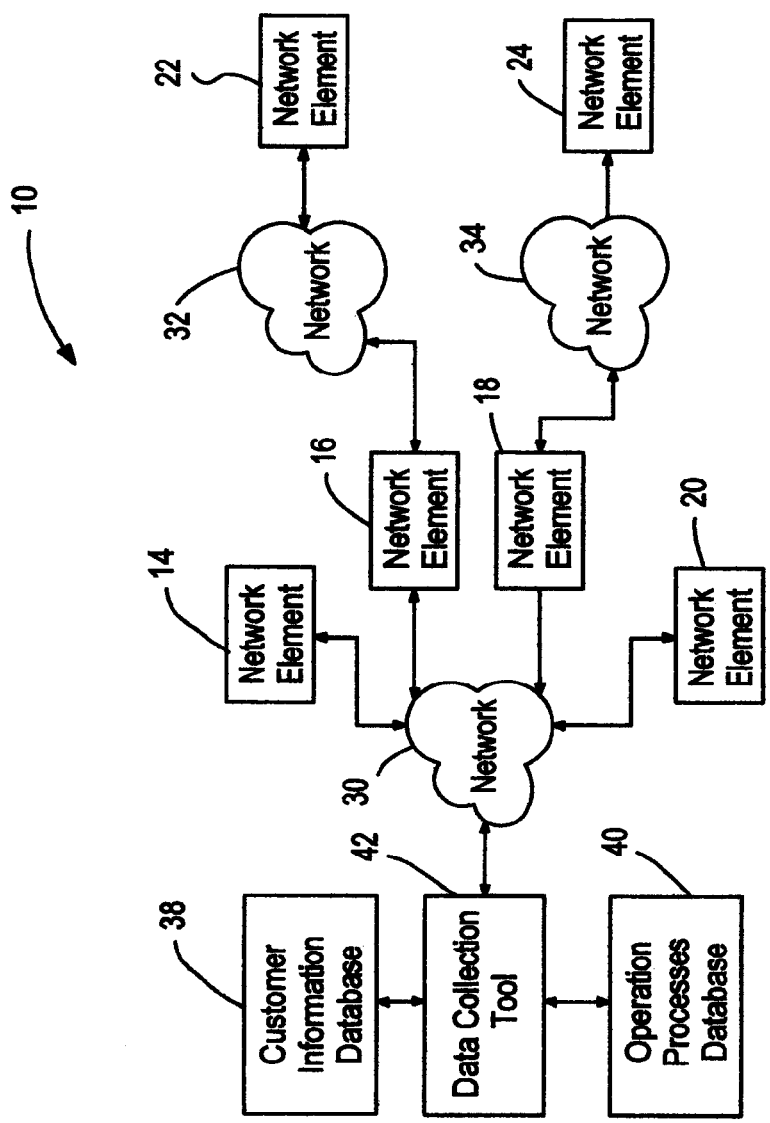
FIG. 1 illustrates a system in accordance with one non-limiting aspect of the present invention.

FIG. 1 illustrates a system 10 in accordance with one non-limiting aspect of the present invention. The system 10 relates to a network environment wherein a network provider provides a number of network elements 14-24 to support a plurality of customer networks 30-34. The network provider may charge customers a fee for providing and supporting the customer networks.

The customer networks 30-34 and network elements 14-24 providing the infrastructure thereof are configured to support any type of network. The networks may include terrestrial or extraterrestrial, wireless or wireline line infrastructures and/or some combination thereof. The networks may be an optical network, a synchronous optical network (SONET), multi-service optical network (MON), an Ethernet, or any other private or virtual private network (VPN).

The system includes a customer information database 38 for storing information relating the to the customers. The customer information database 38 is associated with information generally collected prior to provisioning of the network and the network elements 14-24. The information is inputted by a network planner or other individual associated with allocating network resources. For example, when a customer purchases a SONET ring, VPN, or other network arrangement, the network planner must allocate portions of existing network elements and/or add new network elements 14-24 to support the operation thereof. The required network elements 14-24 are noted in the customer information database 38 and associated with the customer thereof such that the customer information database 38 includes a listing of all the network elements 14-24 and the customers associated therewith.

The customer information database 38 includes network element identifiers for the network elements 14-24 used to support customer networking. The network element identifiers are assigned to the network elements 14-24 through the above described provisioning process. The identifiers are stored on the customer information database 38 and/or retrieved from the network elements 14-24 for storage thereon. The network element identifiers may include a network identifier (NID), a circuit identifier (CID), a target identifier (TID), and an axis identifier (AID).

The NID identifies the network 30-34 supported by the network element 14-24 from other networks 30-34 supported by the provider and/or other networks 30-34 associated with a particular customer. The network elements may support multiple networks and/or multiple network elements may share the same NID. The TID is assigned to the network element 14-24 identifying its geographic location within the networks 30-34, whether it is a customer premises or non-customer premises device, and other information related thereto. The AID is used to identify line cards, ports, slots, gear types, and other features and interfaces included within the network elements such that the network element is identified by its TID and its features further identified on a discrete level by the AIDs associated therewith.

The CID identifies the network elements 14-24 as a function of whether the network elements 14-24 cooperate with each other to define a ring, private or virtual private network, or other cooperative networking arrangement for the customer. For example, each customer may have one or more SONET rings with each ring being associated with a different CID. The network elements 14-24 within each grouping share a common CID such that each network element 14-24 within the grouping are identified as a function of its CID, which in turn, permits determining further information on the network element form the TIDs and AIDs associated therewith. In the case of virtual private networks (VPNs) and other arrangements where common network elements 14-24 support multiple customers, the same CIDs, TIDs, and AIDs are associated with different customers.

The system 10 includes an operation processes database 40 for storing information relating to controlling operation of the network elements 14-24. The operational processes database 40 is distinguished from the customer information database 38 in that it relates to the network elements on a logical, as opposed to physical level. The operation processes database 40 includes software, code, and other information related to controlling and maintaining operation of the network elements 14-24 from a logical perspective. The use of such separate databases is common in deployed networks.

The operation processes database 40 includes network addressing information to facilitate network communications with the network elements 14-24. For example, the network elements 14-24 may each be assigned a public or private internet protocol (IP) or other media access control (MAC) address. The network addressing information is used to communicate electronically with the network elements 14-24, such as for provisioning the operation thereof and otherwise communicating instructions thereto.

The operational process database 40 includes one or more of the network element identifiers included within the customer information database 38. The identifiers may be used by the operation process database 40 to facilitate identification of the network elements 14-24. Unlike the customer information database 38, however, the operational process database 40 includes the network element identifiers without regard to the customers associated therewith. In contrast, the customer information database 38 stores the network element identifiers as a function of the customers associated therewith and without regard to the network addresses of the network elements 14-24.

Figure 2:
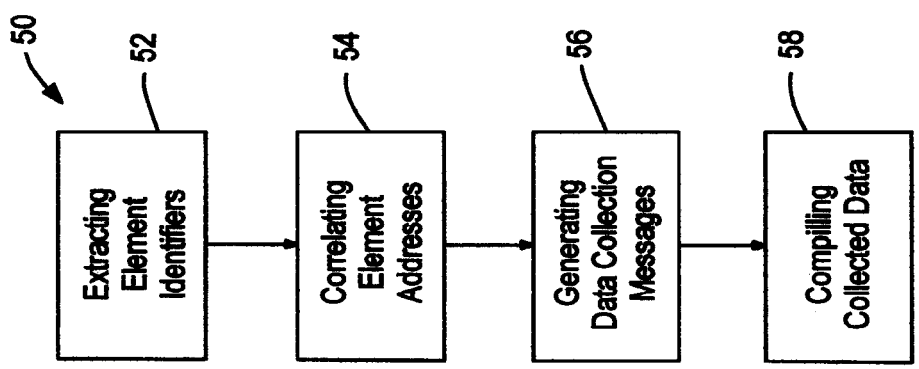
FIG. 2 illustrates a flowchart of a method for collecting data from network elements in accordance with one non-limiting aspect of the present invention.

FIG. 2 illustrates a flowchart 50 of a method for collecting data from the network elements 14-24 in accordance with one non-limiting aspect of the present invention. The method generally includes collecting the data from the network elements 14-24 and compiling the data for use by customers, such as to permit the customer to verify contractual commitments and/or to trouble-shoot or otherwise analyze network performance issues.

The method may be embodied in a computer-readable medium or other logically functioning element for execution by a computer or other feature associated with a data collection tool 42. Any number or protocols, operations, and other functions may be executed by the tool 42 to facilitate the operations expressed below.

Block 52 relates to extracting network element identifiers for one or more customers from the customer information database 38. The customers may be selected randomly by the tool 42 or through a systematic selection process, such as for periodically compiling data for each customer of the service provider and/or for only those customers paying for access to the performance information. The network element identifiers associated with each of the selected customers is arranged by customer in a customer list or other medium associated with the tool 42.

Block 54 relates to correlating the network addresses stored in the operation processes database 40 with the network elements 14-24 provided in the customer list. The tool 42 may cross-reference the network element identifiers included within the customer list with the network addresses included within the operation processes database 40. The addresses matching the network element identifiers are extracted from the database 40 and added to the customer list for the corresponding network element 14-24. For example, the tool 42 may extract the network addresses associated with particular TIDs included within the customer list.

The customer list indicates each customer, the network elements 14-24 associated therewith, and the network addresses for the network elements 14-24. Optionally, the list may be further partitioned as a function of the customer and one or more of the network element identifiers. For example, the customer list may group each network element 14-24 associated with a particular network element as a function of the NID and/or CID of the elements 14-24. This is helpful in grouping network elements of customers having multiple networks or rings located at different locations.

Block 56 relates to generating messages for each of the network elements 14-24 identified in the customer list. The messages include instructions for retrieving data from the network elements 14-24. For example, the instructions may be used to control a reporting function of the network elements 14-24 such that the network elements 14-24 are controlled to report metrics on a regular basis or upon occurrence of a triggering event.

Block 58 relates to compiling data received from the network elements 14-24 in response to the messages. The data may relate to performance and other metrics associated with the operation of the network elements 14-24. The data may be grouped on a per customer basis and stored on a server (not shown) or other remotely accessible medium. The server may be configured to permit secured access thereto by the customers associated with the compiled data. Optionally, the customers may be limited to viewing data associated with their network elements and not the network elements associated with other customers.

The foregoing process may be used in an automated computer-implemented environment to collect data for any number of customers and to output the compiled data for remote access by the customers. This is advantageous in permitting the customers to analyze whether contractual performance metrics are being met and to analyze or otherwise troubleshoot performance of their network elements.

In accordance with one non-limiting aspect of the present invention, the data may be arranged into reports (not shown). Multiple reports on different areas of performance and operation may be generated for each customer. The reports are appropriately labeled to facilitate access thereto by the customers. For example, one report may be an alarm messaging report wherein alarms reported by the network elements are provided to the customer for review.

The alarms are determined according to predefined condition codes included on the network elements and programmed for operation with the message sent thereto by the tool. Optionally, alarm events specified by the condition codes are used to trigger autonomous messages to notify maintenance and operational personnel of failure or fault conditions that require an immediate response. The autonomous alarm event messages carry an alarm event (ALMEVT) label. Office alarms alert local maintenance personnel with audible and visible indications that an alarm event exists. Alarm events can also be reported to a remote operations support system (OSS).

Transient condition messages also are used to provide a record of events that are momentary. These may or may not be associated with an alarm event. Autonomous transient condition messages carry an event transient condition (EVTTC) label. The following are two possible categories: (1) notification of threshold crossings of performance monitoring (PM) parameters; and (2) notification of switches between Working and Protection equipment.

Standing conditions message are also used to provide a record of events resulting from a manual operation, such as a manual switch, loopback, mis-mounted cards, or the use of the internal test signal capability of the network element (NE) where the condition remains present until the manual action that created the condition is released. Many standing conditions are accompanied by the alarm event, which stays active until the manual switch, loopback, or signal injection is released. Standing conditions trigger autonomous messages that carry an EVTSC label.

In accordance with one non-limiting aspect of the present invention, alarm filtering is provided by the tool 42 or instigated by the customer upon access to the server. The alarm filtering is used to automatically filter the reported alarms. In the case of Dedicated Rings (SRAS, DSRS Customer owns the ring), for example, the customer is able see all Service Affecting Critical, Major, Minor alarms, conditions, and events associated with that ring (Equipment, Facility, Environmental and Synchronization). On DS1, DS3, Ethernet, and OCn point to point circuits, for example, the customer is only allowed to see the alarms and conditions on their facility. On those types of circuits the customer is restricted from reviewing equipment, synchronization, or high speed carrier alarms (for example, customer has an 0C48 circuit transported by an OC192 system).

Figure 3:
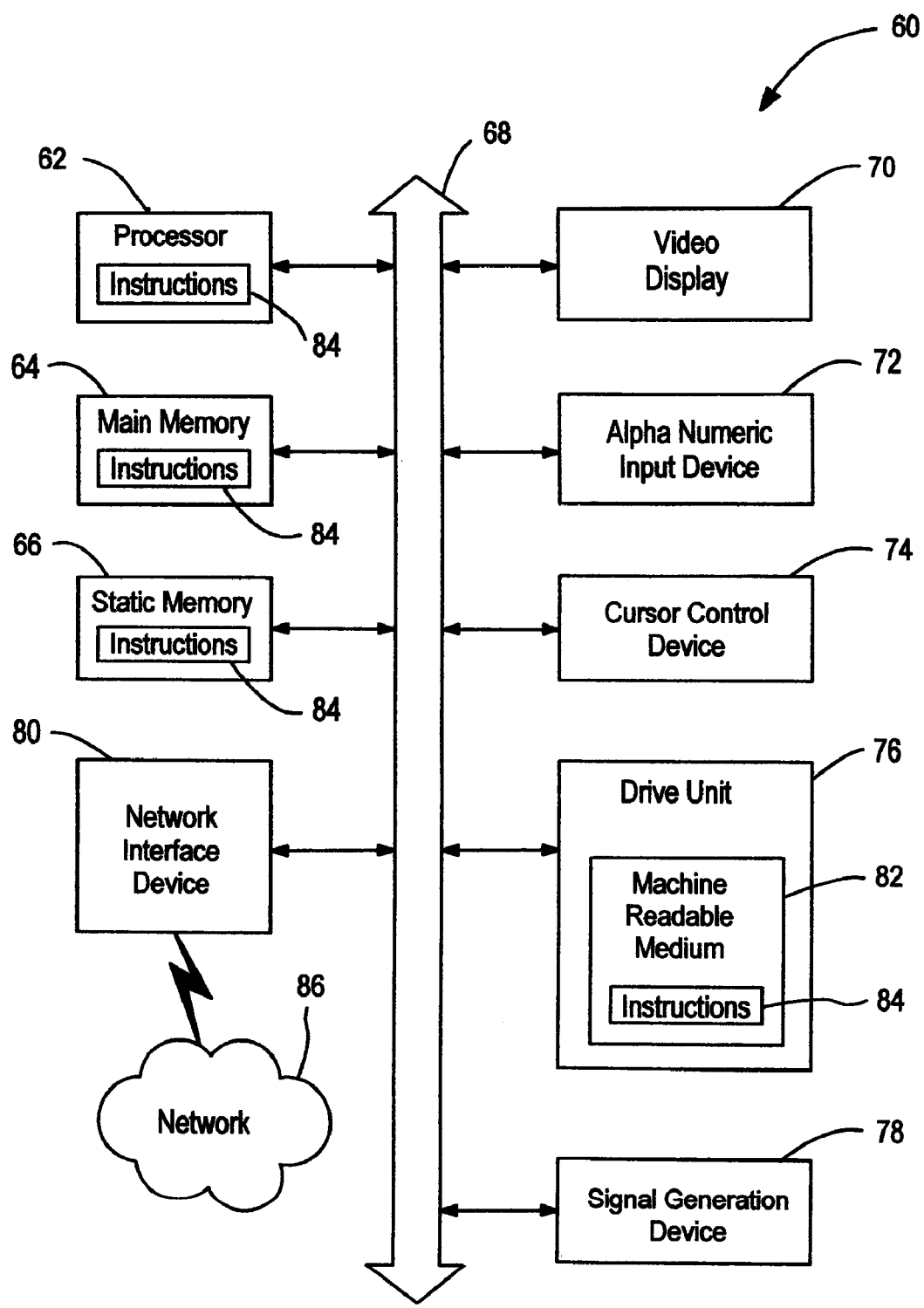
FIG. 3 is a diagrammatic representation of a machine in accordance with one non-limiting aspect of the present invention.

FIG. 3 is a diagrammatic representation of a machine in the form of a computer system 60 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 60 may include a processor 62 (e.g., a central processing unit (CPU), a graphics processing unit (GPU), or both), a main memory 64 and a static memory 66, which communicate with each other via a bus 68. The computer system 60 may further include a video display unit 70 (e.g., a liquid crystal display (LCD), a flat panel, a solid state display, or a cathode ray tube (CRT)). The computer system 60 may include an input device 72 (e.g., a keyboard), a cursor control device 74 (e.g., a mouse), a disk drive unit 76, a signal generation device 78 (e.g., a speaker or remote control) and a network interface device 80.

The disk drive unit 76 may include a machine-readable medium 82 on which is stored one or more sets of instructions (e.g., software 84) embodying any one or more of the methodologies or functions described herein, including those methods illustrated in herein above. The instructions 84 may also reside, completely or at least partially, within the main memory 64, the static memory 66, and/or within the processor 62 during execution thereof by the computer system 60. The main memory 64 and the processor 62 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 84, or that which receives and executes instructions 84 from a propagated signal so that a device connected to a network environment 86 can send or receive voice, video or data, and to communicate over the network 86 using the instructions 84. The instructions 84 may further be transmitted or received over the network 86 via the network interface device 80.

While the machine-readable medium 82 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of collecting data for network elements used to support customer networks, the method comprising:
    extracting network element identifiers identifying network elements used to support the customer networks for one or more customers from a customer information database, wherein the customer information database includes the network element identifiers for the network elements with regard to the customers associated therewith and without regard to network element addresses for the network elements;
    extracting network element addresses for one or more network elements from a network element addressing database as a function of the network element identifier associated therewith, the network element addresses providing information sufficient for electronically locating and communicating with the network elements, wherein the network element addressing database includes the network element identifiers for the network elements with regard to the network element addresses of the network elements and without regard to the customers associated therewith;
    correlating the network element addresses with the customers associated with the network element identifiers such that each network element is associated with a customer and a network element address;
    addressing instructions to the network elements based on the network element address and the customer associated therewith, the instructions instructing the network elements to provide data for use in assessing the operation thereof;
    compiling the data provided by the network elements in a database according to the customer associated therewith;
    generating a report for each customer based on the data compiled in the database, the report indicating performance of one or more network elements associated with the customer; and
    including condition codes in the addressing instructions for triggering generation of alarm messages by the network elements, the alarm messages including the data comprising the reports;
    wherein the condition codes trigger autonomous messages to notify personnel of failure or fault conditions that require an immediate response;
    wherein the condition codes trigger transient condition messages to provide a record of events that are momentary;
    wherein the transient condition messages include at least one of a notification of threshold crossings of performance monitoring (PM) parameters or notification of switches between Working and Protection equipment.

2. The method of claim 1 further comprising hosting the report on a server for access by the customers.

3. The method of claim 1 further comprising identifying network rings for each customer as a function of network ring identifiers included within the customer information database and compiling reports for each network ring to indicate the operation thereof.

4. The method of claim 3 further comprising identifying the network rings based on connectivity information included with the customer information database.

5. The method of claim 1 further comprising including performance information in the reports.

6. The method of claim 5 wherein the performance information includes alarm data for the network elements in the reports.

7. The method of claim 5 wherein the performance information is provided through autonomous, transient, and standing condition messages provided by the network elements.

8. A method of collecting data for network elements used to support customer networks in a deployed system wherein customer information is stored in a customer information database and network element operation information is stored in an operation processes database, the customer information database lacking network addresses for the network elements and the operation processes database lacking customer identifying information for the network elements, the method comprising:
    compiling a customer list from information extracted from the customer information database and the operation processes database, the customer list indicating one or more customers and the network elements associated therewith, the customer list further including network addresses for each of the listed network elements;
    automatically generating data collection messages to the network addresses specified in the customer list, the data collection messages being suitable for retrieving data from that network elements;
    generating a report for each customer in the customer list based on the collected data; and
    including condition codes in the data collection messages for triggering generation of alarm messages by the network elements, the alarm messages including the data comprising the reports;

wherein the condition codes trigger autonomous messages to notify maintenance and operational personnel of failure or fault conditions that require an immediate response;

wherein the condition codes trigger transient condition messages to provide a record of events that are momentary;

wherein the transient condition messages include at least one of a notification of threshold crossings of performance monitoring (PM) parameters or notification of switches between Working and Protection equipment.

9. The method of claim 8 further comprising hosting the reports on a remotely accessible storage medium for remote access by the customers.

10. The method of claim 9 further comprising restricting customer access to at least a portion of the data provided in one or more of the reports.

11. The method of claim 8 wherein the condition codes trigger standing condition messages to provide a record of events resulting from a manual operation of the network element where the condition remains present until the manual operation that created the condition is released.

12. The method of claim 8 further comprising filtering the alarm messages.

13. A machine-readable storage medium for collecting data for network elements used to support customer networks, the machine-readable storage medium comprising:

instructions for compiling a customer list from information extracted from a customer information database and an operation processes database, the customer list including one or more customers and the network elements associated therewith, the customer list further including network addresses for each of the listed network elements;

instructions for automatically generating data collection messages to the network addresses specified in the customer list, the data collection messages being suitable for retrieving data from the network elements;

instructions for generating a report for each customer based on the collected data; and instructions for including condition codes in the data collection messages for triggering generation of alarm messages by the network elements, the alarm messages including the data comprising the reports;

wherein the condition codes trigger autonomous messages to notify personnel of failure or fault conditions that require an immediate response;

wherein the condition codes trigger transient condition messages to provide a record of events that are momentary;

wherein the transient condition messages include at least one of a notification of threshold crossings of performance monitoring (PM) parameters or notification of switches between Working and Protection equipment.

* * * * *